United States Patent
Yun et al.

(10) Patent No.: US 7,569,805 B2
(45) Date of Patent: Aug. 4, 2009

(54) APPARATUS AND METHOD FOR CALIBRATING A REFLECTING MIRROR

(75) Inventors: Sang Kyeong Yun, Gyeonggi-do (KR); Seung Do An, Gyeonggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 682 days.

(21) Appl. No.: 11/449,534

(22) Filed: Jun. 7, 2006

(65) Prior Publication Data

US 2006/0279198 A1    Dec. 14, 2006

(30) Foreign Application Priority Data

Jun. 10, 2005 (KR) ........................ 10-2005-0049928
Mar. 10, 2006 (KR) ........................ 10-2006-0022637

(51) Int. Cl.
*H01J 3/14* (2006.01)
*G01D 5/34* (2006.01)

(52) U.S. Cl. .................................... 250/216; 250/231.1
(58) Field of Classification Search ................. 250/216, 250/221, 231.1, 559.1; 359/224, 290–292, 359/572–573; 345/53, 77, 690

See application file for complete search history.

(56) References Cited

U.S. PATENT DOCUMENTS 6,479,811 B1 * 11/2002 Kruschwitz et al. ..... 250/237 G
6,898,377 B1    5/2005 LeHoty et al.

FOREIGN PATENT DOCUMENTS

JP    2001-296482 A    10/2001
KR    10-2005-0043801 A    5/2005

* cited by examiner

*Primary Examiner*—Que T Le
*Assistant Examiner*—Don Williams
(74) *Attorney, Agent, or Firm*—Christensen O'Connor Johnson Kindness PLLC

(57) ABSTRACT

An apparatus for measuring the position of the mirror of a diffractive light modulator and performing positional compensation, and a method of controlling the apparatus. A position measurement unit measures the position of a mirror of the diffractive light modulator. A control unit calculates the value of displacement from a reference position by evaluating a position value calculated by the position measurement unit, calculates a compensation value and outputs a compensation control signal. A compensation and actuation unit performs compensation on a drive voltage in response to the compensation control signal, and actuates the mirror of the diffractive light modulator using the compensated drive voltage.

31 Claims, 13 Drawing Sheets

| Input gray level | Output gray level | | | |
|---|---|---|---|---|
| | Pixel 1 | Pixel 2 | . . . . | Pixel n |
| 0 | 5 | 4 | | 3 |
| 1 | 6 | 5 | | 4 |
| ⋮ | ⋮ | ⋮ | . . . . | ⋮ |
| 254 | 249 | 248 | | 247 |
| 255 | 250 | 249 | | 248 |

APPARATUS AND METHOD FOR CALIBRATING A REFLECTING MIRROR

BACKGROUND

1. Technical Field

The present invention relates generally to an apparatus for measuring the position of the mirror of a diffractive light modulator and performing positional compensation and a method of controlling the apparatus, and, more particularly, to an apparatus for measuring the position of the mirror of a diffractive light modulator and performing positional compensation, which measures the position of the mirror of a diffractive light modulator by measuring the capacitance of the mirror, the capacitance of a piezoelectric material layer or the intensity of output diffracted light and performs positional compensation, and a method of controlling the apparatus.

2. Description of the Related Art

With the development of microtechnology, Micro-Electro-Mechanical Systems (MEMS) devices and small-sized equipment, into which MEMS devices are assembled, are attracting attention.

A MEMS device is formed on a substrate, such as a silicon substrate or a glass substrate, in microstructure form, and is a device into which an actuator for outputting mechanical actuating force and a semiconductor Integrated Circuit (IC) for controlling the actuator are electrically or mechanically combined. The fundamental feature of such a MEMS device is that an actuator having a mechanical structure is assembled in part of a device. The actuator is electrically operated using Coulomb's force between electrodes.

FIGS. 1 and 2 illustrate the constructions of representative optical MEMS devices that utilize the reflection or diffraction of light and are applied to optical switches or light modulation devices.

The optical MEMS device 1 illustrated in FIG. 1 includes a substrate 2, a substrate side electrode 3 formed on the substrate 2, a cantilevered beam 6 configured to have an actuation side electrode 4 that is disposed opposite and parallel to the substrate side electrode 3, and a support 7 configured to support one end of the cantilevered beam 6. The beam 6 and the substrate side electrode 3 are electrically insulated from each other by a gap 8.

In the optical MEMS device 1, the beam 6 is displaced by electrostatic attractive force or electrostatic repulsive force generated between the beam 6 and the substrate side electrode 3 depending on electrical potential applied between the substrate side electrode 3 and the actuation side electrode 4. For example, as illustrated by the solid and dotted lines of FIG. 1, the beam 14 is displaced parallel to the substrate side electrode 3.

An optical MEMS device 11 illustrated in FIG. 2 includes a substrate 12, a substrate side electrode 13 formed on the substrate 12, and a beam 14 formed across the substrate side electrode 13 in bridge form. The beam 14 and the substrate side electrode 13 are electrically insulated from each other by a gap 10.

The beam 14 includes bridge members 15 configured to have a bridge shape and made of, for example, an SiN film, and an actuation side electrode 16 supported by the bridge members 15 to be opposite and parallel to the substrate side electrode 13, made of an Al film having a thickness of 100 nm and configured to function as a reflecting film also. The beam 14 is constructed in a bridge form, in which both ends thereof are supported.

In the optical MEMS device 11, the beam 14 is displaced by electrostatic attractive force or electrostatic repulsive force generated between the beam 14 and the substrate side electrode 13 depending on electric potential applied between the substrate side electrode 13 and the actuation side electrode 16. For example, as illustrated by the solid and dotted lines of FIG. 2, the beam 14 is displaced to be parallel to and to be depressed toward the substrate side electrode 3.

The optical MEMS devices 1 and 11 may be used as optical switches that are provided with switch functions in such a way as to radiate light onto the surfaces of actuation side electrodes 4 and 16 which also function as reflecting films and detect reflected light having one direction based on the fact that the reflected directions of light are different depending on the actuated positions of the beams 4 and 14.

Furthermore, the optical MEMS devices 1 and 11 may be used as optical modulation devices for modulating the intensity of light.

When the reflection of light is utilized, the intensity of light is modulated using the amount of reflected light per unit time in one direction by vibrating the beam 4 or 14.

In contrast, when the diffraction of light is utilized, a light modulation device is constructed by parallelly arranging a plurality of beams 6 or 14 with respect to a common substrate side electrode 3 or 13, the heights of actuation side electrodes also functioning as light reflecting films are changed by the approach and separation of alternate beams 6 or 14 to and from the common substrate side electrode 3 or 13, and the intensity of light reflected by the actuation side electrodes is modulated by the diffraction of light. This type of light modulation device is a so-called spatial modulation device.

FIG. 3 illustrates the construction of a Grating Light Valve (GLV) device that was developed as a light intensity conversion device for a laser display, that is, a light modulator.

The GLV device 21, as illustrated in FIG. 3, is constructed in such a way that a shared substrate side electrode 23 is formed on an insulated substrate 22, such as a glass substrate, and a plurality of beams 24, in the present embodiment, six beams 24 (241, 242, 243, 244, 245 and 246), are arranged parallel to each other across the substrate side electrode 23 in a bridge form. The construction of the substrate side electrode 23 and the beam 24 is the same as that described above in conjunction with FIG. 2.

The beams 24, which include bridge members 25, and actuation side electrodes 26 configured to be disposed on the bridge members 25 and also to function as reflecting films, are commonly called "ribbons".

When a small amount of voltage is applied between the substrate side electrode 23 and the actuation side electrodes 26 also functioning as reflecting films, the beams 24 move toward the substrate side electrode 23 due to the above-described electrostatic phenomenon. In contrast, when the application of the voltage is stopped, the beams 24 are separated from the substrate side electrode 23 and return to the initial positions thereof.

In the GLV device 21, the heights of the actuation side electrodes 26 are alternately changed by an operation in which the plurality of beams 24 approach or are separated from the substrate side electrode 23 (that is, the approach or separation of the plurality of beams 24) and the intensity of light reflected by the actuation side electrodes 26 is modulated by the diffraction of light (a single light spot is radiated onto a total of six beams 24).

Meanwhile, the above-described diffractive light modulator is a device that changes optical signals by actuating an upper micromirror layer. In this case, notwithstanding that the upper micromirror layer must be maintained at an initial position after actuation, the upper micromirror layer may be located at a position other than the initial position thereof (drift) due to the environment and the elapse of time. When the position of the upper micromirror layer is restored to the initial position, the performance of the diffractive light modulator can be maintained.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Accordingly, the present invention has been made keeping in mind the above problems occurring in the prior art. An apparatus is provided for measuring the position of an upper micromirror layer and performing positional compensation, and a method is described for controlling the apparatus.

The apparatus for measuring the position of the mirror of a light modulator and performing compensation, correction, or calibration, includes: a position measurement unit for measuring the position of a micromirror of the light modulator; a control unit for calculating the value of displacement from a reference position by evaluating a position value calculated by the position measurement unit, calculating a compensation or calibration value and outputting a compensation control signal; and a compensation and actuation unit for performing compensation or calibration on a drive voltage in response to the compensation control signal input from the control unit, and actuating the upper micromirror of the diffractive light modulator using the compensates: drive voltage.

In addition, the present invention provides an apparatus for measuring the position of a mirror of a diffractive light modulator and performing compensation or calibration, including a light source for generating light and emitting the light; a diffractive light modulator for generating diffracted light by modulating the light incident from the light source when a drive signal is input; a drive means for outputting a drive signal to the diffractive light modulator; a light amount detection means for measuring an amount of diffracted light emitted by the diffractive light modulator; and a correction data calculation means for calculating pixel-based correction data using the amount of diffracted light obtained by the light amount detection means when a tester sets a reference voltage range based on the amount of diffracted light output from the light amount detection means.

In addition, the present invention provides a method of controlling an apparatus for measuring the position of the mirror of a diffractive light modulator and performing compensation, including: measuring the position of a micromirror of the diffractive light modulator; calculating the value of displacement from a reference position by evaluating a position value calculated by the position measurement unit, calculating a compensation value and outputting a compensation control signal; and compensating a drive voltage for the micromirror in response to the compensation control signal input from the control unit, and actuating the micromirror of the diffractive light modulator using the compensated drive voltage.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
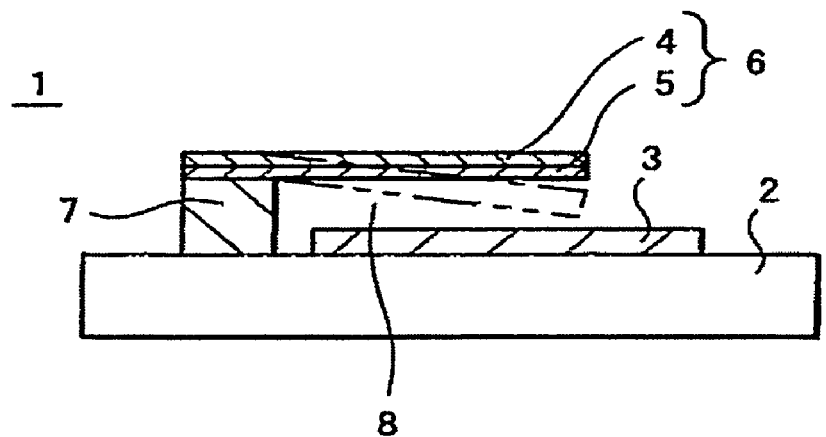
FIGS. 1 and 2 diagrams illustrating the construction of representative optical MEMS devices that utilize the reflection or diffraction of light and are applied to optical switches and light modulation devices.
Figure 2:
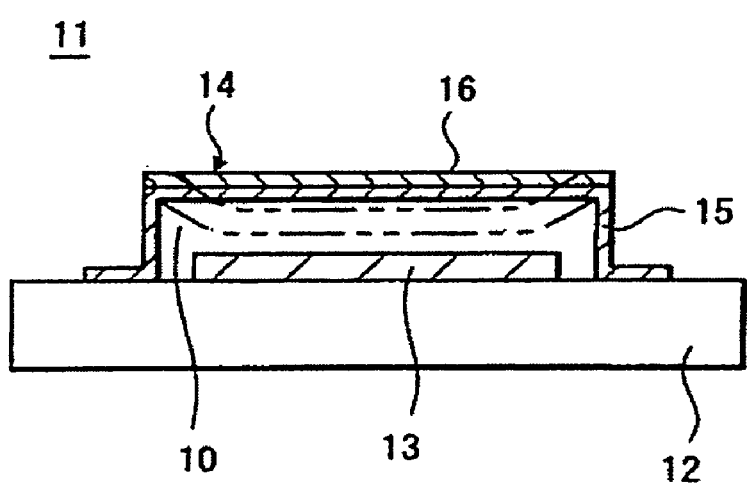

Reference now should be made to the drawings, in which the same reference numerals are used throughout the different drawings to designate the same or similar components.

With reference to FIGS. 4A to 13, an apparatus for measuring the position of the mirror of a diffractive light modulator and a method of controlling the apparatus is described in detail.

Figure 4A:
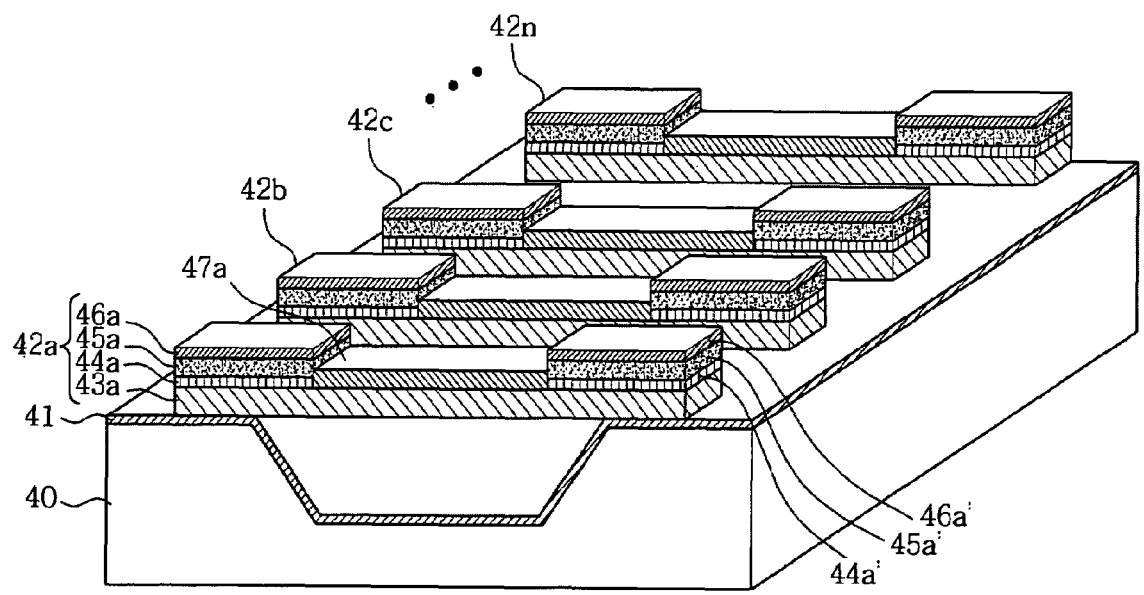
FIG. 4A is a perspective view illustrating a recess-type diffractive light modulator to which the present invention is applied.

FIG. 4A is a perspective view illustrating a recess-type diffractive light modulator to which the present invention is applied and which uses piezoelectric material.

Referring to FIG. 4A, the thin film piezoelectric light modulator includes a silicon substrate 40 and a plurality of elements 42a~42n.

Elements 42a~42n may have a uniform width, and are regularly arranged and constitute a recess-type thin film piezoelectric light modulator. Alternatively, elements 42a~42n may have different widths, and are alternately arranged and constitute a recess-type thin film piezoelectric light modulator. Furthermore, the elements 42a~42n are shown as spaced apart from each other at regular intervals (for example, substantially equal to the widths of the element 42a~42n), in which case a micromirror layer formed over the entire upper surface of a silicon substrate 40 diffracts incident light by reflecting the incident light.

The silicon substrate 40 has a recess so as to provide air space to the elements 42a~42n. An insulating layer 41 is disposed on the upper surface of the silicon substrate 40, and the ends of the element 42a~42n are attached to opposite sides of the recess.

Each element (although the element 42a is described in detail here, the same description is applied to the remaining elements 42b~42n) has a rod shape. The lower surfaces of the ends of the element are attached to opposite sides of the silicon substrate 40 so that the central portion of the element spans across the recess of the silicon. The element includes a lower support 43a, the portion of which that is located over the recess of the silicon substrate 40 can move vertically.

Furthermore, the element 42a is disposed on the left end of the lower support 43a, and includes a lower electrode layer 44a configured to provide piezoelectric voltage, a piezoelectric material layer 45a disposed on the lower electrode layer 44a and configured to generate vertical actuation force through the expansion and contraction thereof when voltage is applied across both surfaces thereof, and an upper electrode layer 46a disposed on the piezoelectric material layer 45a and configured to provide piezoelectric voltage to the piezoelectric material layer 45a.

The element 42a is disposed on the right end of the lower support 43a, and further includes a lower electrode layer 44a' configured to provide piezoelectric voltage, a piezoelectric material layer 45a' disposed on the lower electrode layer 44a' and configured to generate vertical actuation force through the expansion and contraction thereof when voltage is applied to both surfaces thereof, and an upper electrode layer 46a' disposed on the piezoelectric material layer 45a' and configured to provide piezoelectric voltage to the piezoelectric material layer 45a'.

A micromirror layer 47a is disposed on the upper surface of the lower support 43a located on the center portion of the element 42a, and reflects or diffracts incident light.

Figure 4B:
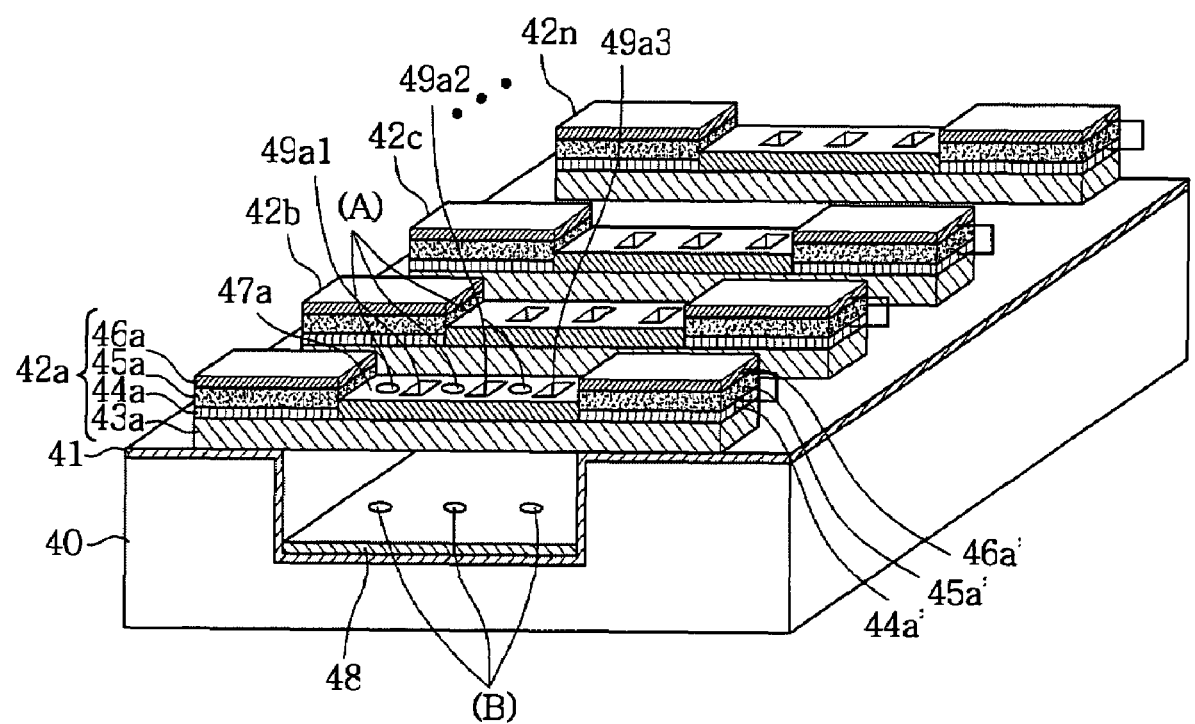
FIG. 4B is a perspective view of an open hole-based diffractive light modulator to which the present invention is applied and which utilizes piezoelectric material.

FIG. 4B is a perspective view of an open hole-based diffractive light modulator to which the present invention is applied and which utilizes piezoelectric material.

Referring to the drawing, the open hole-based diffractive light modulator using piezoelectric materials can be seen to be improved over the conventional diffractive light modulator. The open hole-based diffractive light modulator includes a plurality of open holes 49a1~49a3 on a micromirror layer 47a (hereinafter referred to as an upper micromirror layer to distinguish it) and further includes a lower micromirror layer 48 on the insulating layer 41 of a recess.

The open holes 49a1~49a3 allow light incident on the element 42a to pass through the element 42a and to be incident on the portions of the lower micromirror layer 48 corresponding to the open holes 49a1~49a3, thus allowing the lower micromirror layer 48 and the upper micromirror layer 47a to form pixels.

That is, for example, portion (A) of the upper micromirror layer 47a, through which the open holes 49a1~49a3 are formed, and portion (B) of the lower micromirror layer 48 may form a single pixel. In this case, incident light, which has passed through the portion of the upper micromirror layer 47a through which the open holes 49a1~49a3 are formed, can be incident on the corresponding portion of the lower micromirror layer 48. When the interval between the upper micromirror layer 47a and the lower micromirror layer 48 is an odd multiple of $\lambda/4$, maximally diffracted light is generated.

Meanwhile, the above-described diffractive light modulator is a device for changing an optical signal through the actuation of the upper micromirror layer. In this case, notwithstanding that the upper micromirror layer must be maintained at an initial position after actuation, the upper micromirror layer may be located at a position different from the initial position due to the environment (for example, changes in temperature or humidity) and the elapse of time, wherein the position of the micromirror layer may change due to the structural material of the micromirror layer or an optical lens becoming out of adjustment or electrical circuit variable or variations. In this regard, certain materials such as oxides of PZT may expand or contract due to changes in temperature or humidity. Also, over time electrical charges may accumulate on the micromirror layer, on the support therefor, on the substrate and/or on other components of the modulator, causing physical changes therein. When the position of the upper micromirror layer is restored to the initial position, the performance of the diffractive light modulator can be maintained.

Figure 5A:
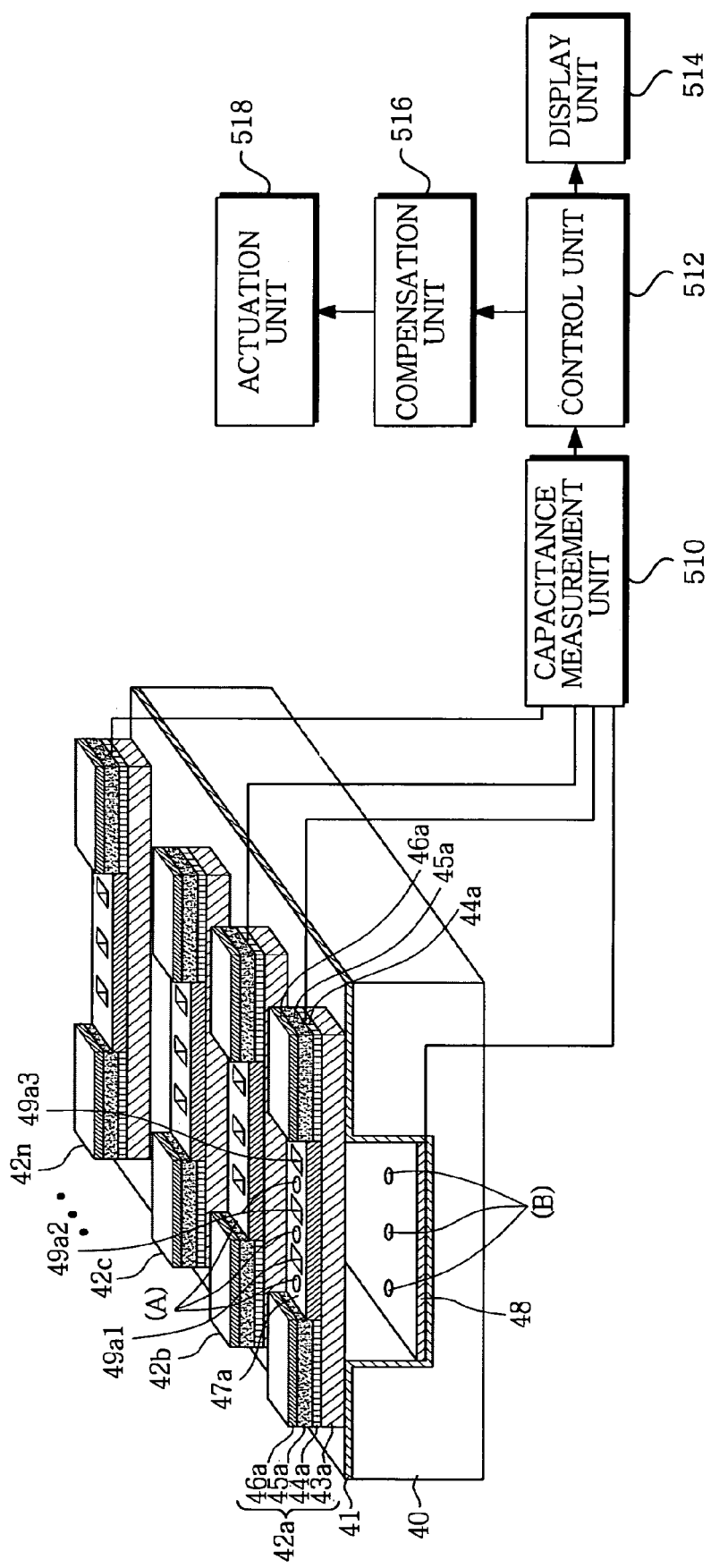
FIG. 5A is a diagram illustrating the construction of an apparatus for measuring the position of the mirror of a diffractive light modulator and performing positional compensation.

FIG. 5A is a diagram illustrating the construction of an apparatus for measuring the position of the mirror of a diffractive light modulator and performing positional compensation.

Referring to the drawing, the apparatus for measuring the position of the mirror of a diffractive light modulator and performing positional compensation, according to the embodiment of the present invention, includes a capacitance measurement unit 510, a control unit 512, a display unit 514, a compensation unit 516, and an actuation unit 518.

The capacitance measurement unit 510 measures the capacitance of the upper micromirror layer 47a and lower micromirror layer 48 of the diffractive light modulator. For this purpose, one terminal of the capacitance measurement unit 510 is connected to the lower electrode layer 44a' of the piezoelectric material layer 45a' electrically connected to the upper micromirror layer 47a, the other terminal thereof is connected to the lower micromirror layer 48, and the capacitance measurement unit 510 measures the capacitance of the upper micromirror layer 47a and the lower micromirror layer 48.

Alternatively, the capacitance measurement unit may be connected between the upper electrode layer 46a of the piezoelectric material 45a electrically connected to the upper micromirror layer 47a and the substrate 40, the substrate 40 acting as a reference electrode.

Figure 5B:
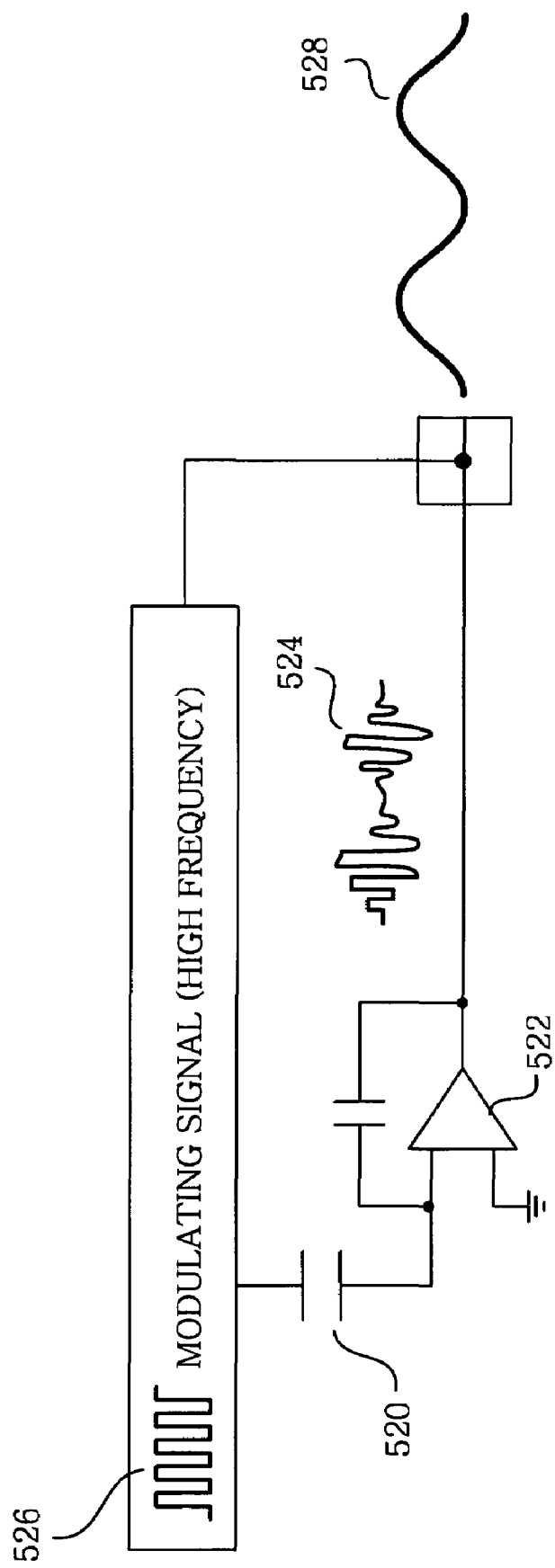
FIG. 5B is a circuit diagram for measuring the position of the mirror in FIG. 5A via measuring a capacitance value related to the position of the mirror.

FIG. 5B provides an example of a circuit diagram for the capacitance measurement unit 510 shown in FIG. 5A. The circuit includes a capacitor 520 that measures the capacitance between the upper micromirror layer 47a and the lower micromirror layer 48 or, alternatively, between the upper micromirror layer 47a and the substrate 40, as noted above. The circuit also includes a charge amplifier 522 that outputs a signal 524. The signal 524 is modulated by a high frequency modulating signal 526, with the resulting output a sinusoidal signal reflective of the measured capacitance. This signal is transmitted to the control unit 512.

The control unit 512 has information about the intensity of diffracted light based on the capacitance of the upper micromirror layer 47a and the lower micromirror layer 48 measured by the capacitance measurement unit 510, calculates a compensation value based on the information, and outputs a compensation control signal to the compensation unit 516.

Then the compensation unit 516 outputs a compensation value, based on the input compensation control signal, to the actuation unit 518, and the actuation unit 518 outputs voltage reflecting the compensation value.

Figure 6:
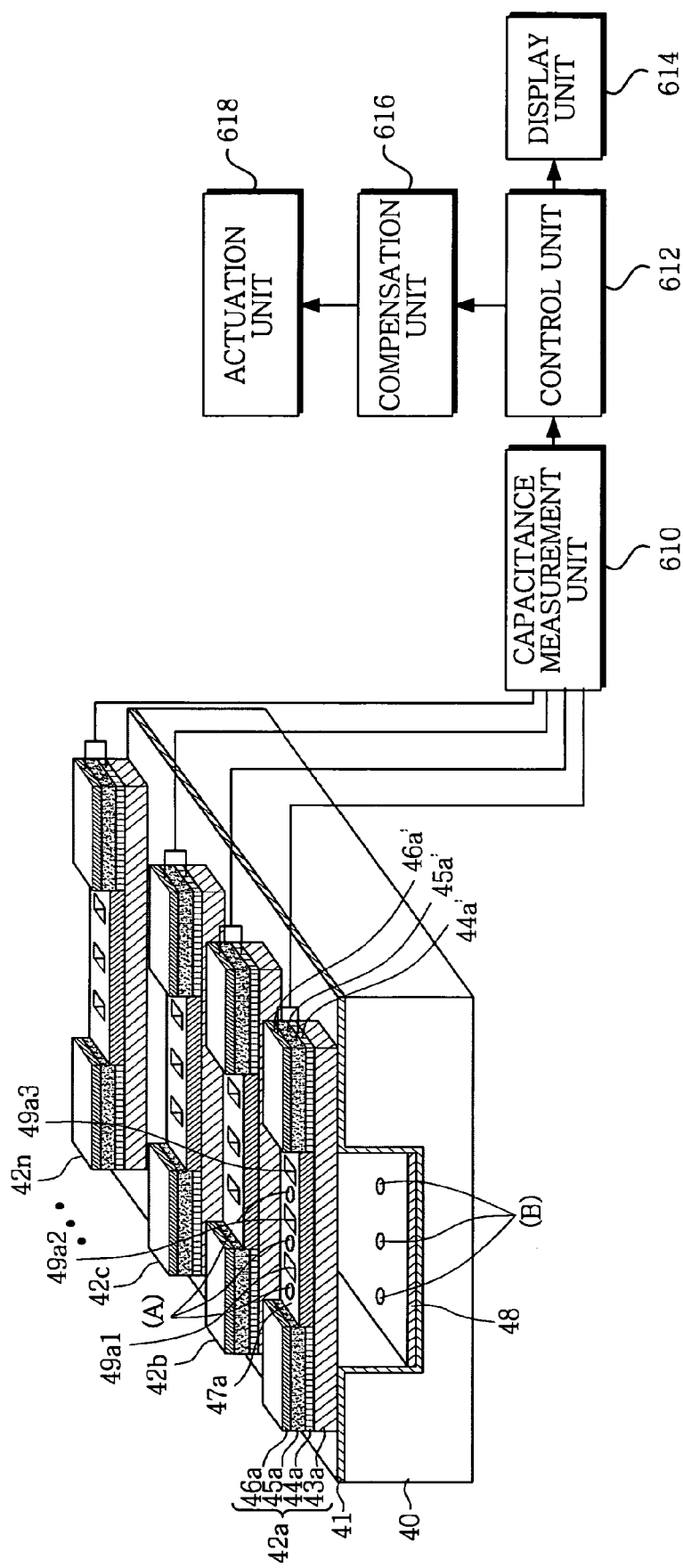
FIG. 6 is another diagram illustrating the construction of an apparatus for measuring the position of the mirror of a diffractive light modulator and performing positional compensation.

FIG. 6 is a diagram illustrating the construction of an apparatus for measuring the position of the mirror of a diffractive light modulator and performing positional compensation, according to another embodiment of the disclosure. Referring to the drawing, the apparatus for measuring the position of the mirror of the diffractive light modulator and performing positional compensation, includes a capacitance measurement unit 610, a control unit 612, a display unit 614, a compensation unit 616, and an actuation unit 618.

The capacitance measurement unit 610 measures the capacitance of the upper micromirror layer 46a' and lower micromirror layer 44a' of the piezoelectric material layer 45a' of the diffractive light modulator. For this purpose, one terminal of the capacitance measurement unit 610 is connected to the upper micromirror layer 46a' and the other terminal thereof is connected to the lower micromirror layer 44a', and then the capacitance measurement unit 610 measures the capacitance of the upper micromirror layer 46a' and the lower micromirror layer 44a'. The capacitance measurement unit 610 may be in the form of a circuit similar to the circuit shown in FIG. 5B and described above.

Furthermore, the control unit 612 has information about the intensity of diffracted light based on the capacitance of the upper micromirror layer 46a' and the lower micromirror layer 44a' measured by the capacitance measurement unit 610, calculates a compensation value based on the information, and outputs a compensation control signal to the compensation unit 616.

Then the compensation unit 616 outputs a compensation value based on the input compensation control signal to the actuation unit 618, and the actuation unit 618 outputs voltage reflecting the compensation value.

Figure 7:
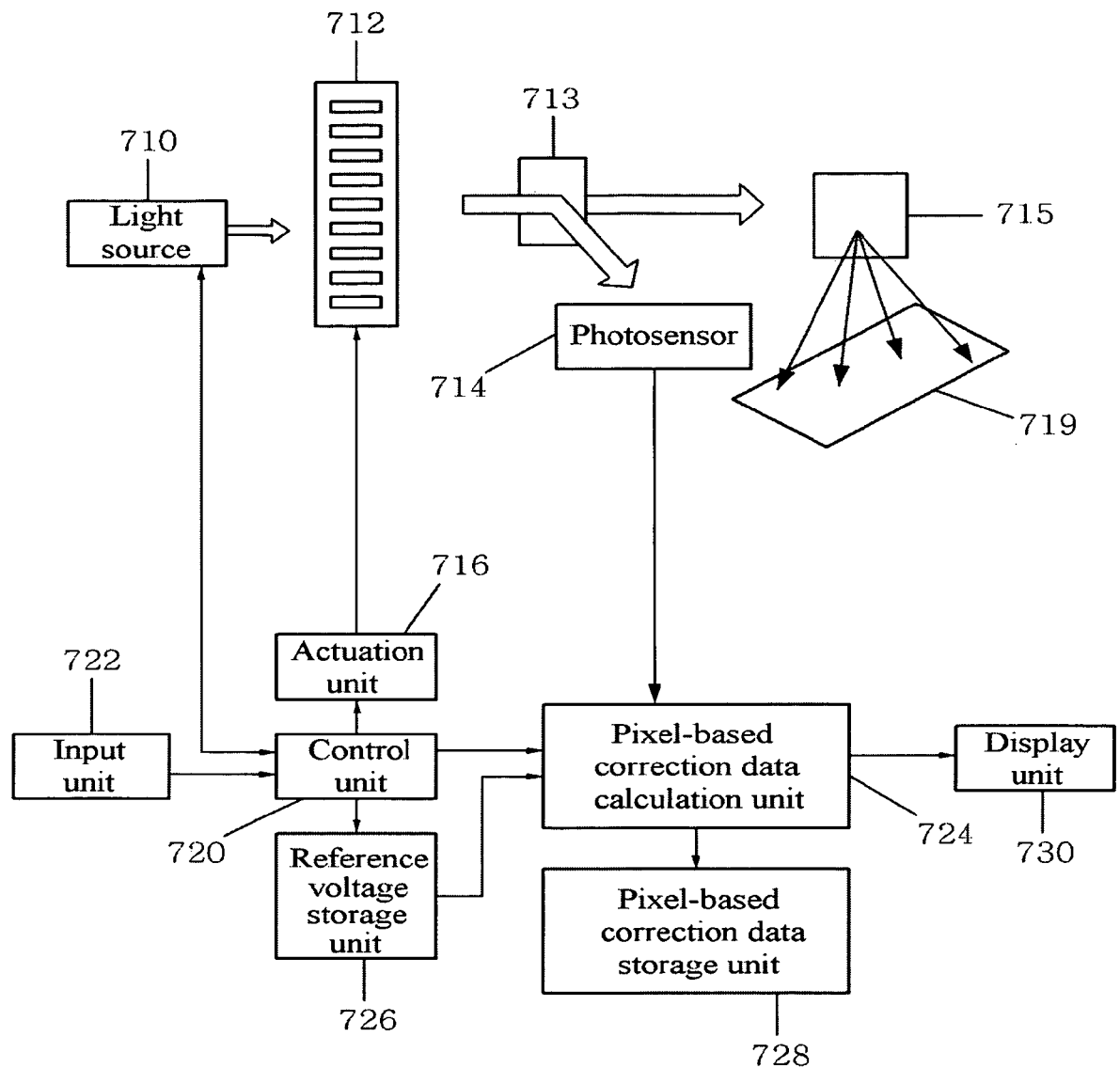
FIG. 7 is another diagram illustrating the construction of an apparatus for measuring the position of the mirror of a diffractive light modulator and performing positional compensation.

FIG. 7 is a diagram illustrating the construction of an apparatus for measuring the position of the mirror of a diffractive light modulator and performing positional compensation, according to another embodiment of the present invention.

Referring to the drawing, the apparatus for measuring the position of the mirror of a diffractive light modulator and performing positional compensation, includes a light source 710, a diffractive light modulator 712, a reflecting mirror 713, a photosensor 714, a scanner 715, a pixel-based light amount detection unit 718, a screen 719, a control unit 720, an input unit 722, a pixel-based compensation data calculation unit 724, a reference voltage data storage unit 726, a pixel-based compensation data storage unit 728, and a display unit 730.

The light source 710 includes a light source R, not shown in FIG. 7, a light source G and a light source B. Only one of the light sources related to a desired color can be turned on under the control of the control unit 720. A tester turns on only a light source related to a desired color while measuring the amount of light.

The actuation unit 716 separately actuates the elements of the diffractive light modulator 712, and repeatedly and vertically actuates each element within a predetermined voltage range.

As the element is vertically actuated by the actuation unit 716, the diffractive light modulator 712 produces diffracted light.

The reflecting mirror 713 reflects part of the diffracted light, produced by the diffractive light modulator 712 which otherwise is directed toward the scanner 715, toward the photosensor 714. The reflecting mirror 713 preferably reflects about from ½ to ¹⁄₁₀₀ of the diffracted light, which is emitted from the diffractive light modulator 712, to the photosensor 714. When the reflecting mirror 713 is provided, the position of the mirror of the diffractive light modulator 712 can be measured, and positional compensation is performed while a display device using the diffractive light modulator 712 is operated.

The photosensor 714 measures the amount of diffracted light emitted from the diffractive light modulator 712, and outputs information about the amount of diffracted light to the pixel-based correction data calculation unit 724.

Then, the pixel-based correction data calculation unit 724 obtains a light amount history curve for each pixel by analyzing the amount of light measured by the photosensor 714, and displays the obtained light amount history curve on the display unit 730. An example of a light amount history curve obtained by the pixel-based correction data calculation unit 724 is illustrated for three pixels in FIG. 11. For pixel 1, the voltage related to the smallest amount of light is Vp1min, and voltage related to the largest amount of light is Vp1max. For pixel 2, voltage related to the smallest amount of light is Vp2min, and voltage related to the largest amount of light is Vp2max. For pixel 3, voltage related to the smallest amount of light is Vp3min and voltage related to the largest amount of voltage is Vp3max.

In that case, a tester can set a reference voltage range such that it can include the lowest voltage capable of detecting the smallest amount of light for all of the pixels and the highest voltage capable of detecting the largest amount of light. As an example, in FIG. 11, g0 and g10 are set.

When the reference voltage range selected by the tester is input through the input unit 722, the input reference voltage data is stored in the reference voltage data storage unit 726.

From the pixel-based light amount history curves the pixel-based correction/compensation data calculation unit 724 calculates pixel-based correction/compensation data based on gray scale with reference to the reference voltage range stored in the reference voltage storage unit 726.

Figures 12, 13:
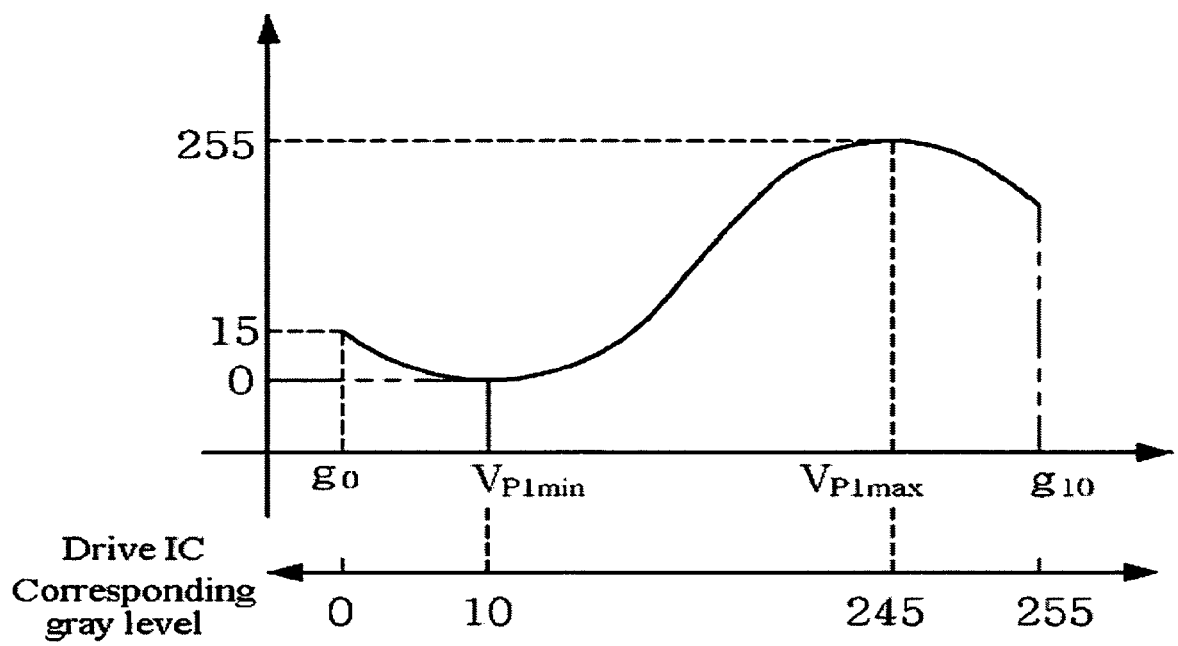
FIG. 12 is a graph illustrating output gray levels with respect to the corresponding gray levels of a drive IC used by the pixel-based correction data calculation unit of FIG. 7.
FIG. 13 is a correction data table stored in the pixel-based correction data storage unit of FIG. 7.

For the understanding of a process of calculating the pixel-based correction/compensation data, it is necessary to understand the operation of a drive IC (not shown) in the display application of the diffractive light modulator 712. When a gray level is input, the drive IC outputs a drive voltage determined according to a reference voltage. That is, as an example, assuming that the reference voltage is g0~g10 and the gray scale has 256 levels, the drive IC outputs a drive voltage of g0 when a gray level of 0 is input, a drive voltage of g10 when a gray level of 255 is input, and a predetermined drive voltage when a value between 0 and 255 is input. Accordingly, when the tester sets the reference voltage range, the drive IC outputs a predetermined drive voltage based on gray scale. That is, once the reference voltage range is determined, the drive IC automatically outputs drive voltage based on the input gray level according to the reference voltage. Meanwhile, as can be known from FIG. 11, since the reference voltage range is not set for each pixel using the highest voltage and the lowest voltage, but is set such that it includes all of the lowest voltages and the highest voltages, correction data for each pixel must be calculated. This is described with reference to FIG. 12 illustrating a light amount history curve only for pixel 1. In the case where a gray scale input from the outside is, for example, 0, output voltage is g0 if 0 is applied to the drive IC without correction, in which case the amount of light output by pixel 1 is 15. Accordingly, in order to solve this discrepancy, gray level 10, which corresponds to Vp1min at which pixel 1 actually outputs 0, is output to the drive IC.

As a result, the pixel-based correction data calculation unit 724 prepares a table, which is illustrated in FIG. 13, using correction gray levels capable of correcting input gray levels input from the outside in the above-described manner, and stores the table in the pixel-based correction data storage unit 728.

That is, from the table of FIG. 13, it can be appreciated that there are externally input gray levels and that gray levels to be output are determined for respective pixels.

For example, for pixel 1, the gray level to be output is 5 when the input gray level is 0, 6 when the input gray level is 1, 249 when the input gray level is 254, and 250 when the input gray level is 255. From the table, it can be seen that an actual loss in gray scale occurs.

Meanwhile, in the display application, in the case where an image is input from the outside, the control unit 720 corrects the input gray level with reference to the correction table stored in the pixel-based correction data storage unit 728, and outputs a corrected gray level.

Figure 8:
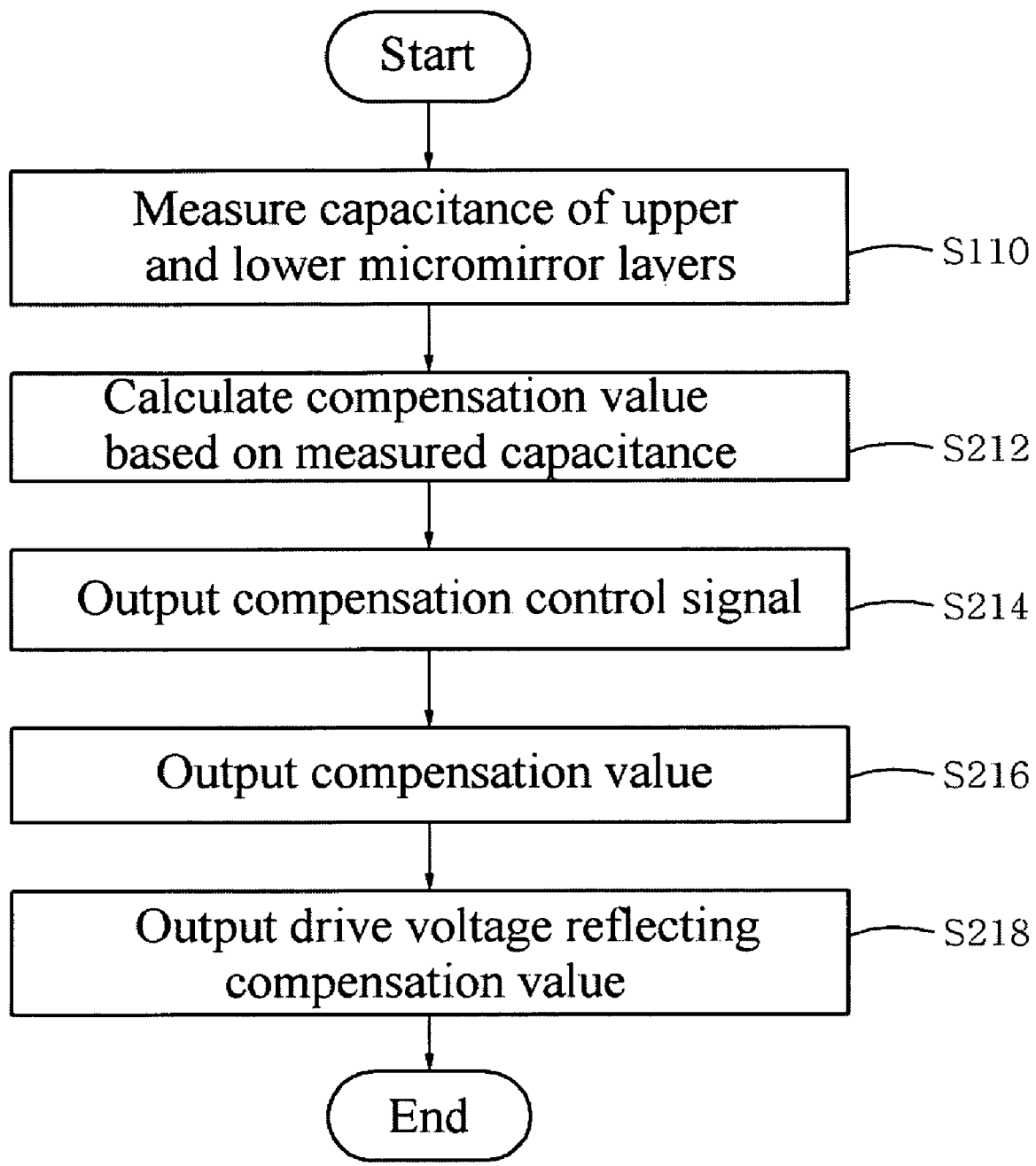
FIG. 8 is a flowchart illustrating a method of controlling the apparatus for measuring the position of the mirror of the diffractive light modulator and performing positional compensation according to FIG. 5A.

FIG. 8 is a flowchart illustrating a method of controlling the apparatus for measuring the position of the mirror of the diffractive light modulator and performing positional compensation, according to an embodiment of the present disclosure.

Referring to the drawing, in the method of controlling the apparatus for measuring the position of the mirror of a diffractive light modulator and performing positional compensation, the capacitance measurement unit measures the capacitance of the upper micromirror layer and lower micromirror layer of the diffractive light modulator at step S110, and outputs the measured capacitance to the control unit.

The control unit has information about the intensity of diffracted light corresponding to the measured capacitance of the upper micromirror layer and the lower micromirror layer measured by the capacitance measurement unit, calculates a compensation value based on the information at step S112, and outputs a compensation control signal to the compensation unit at step S114.

Thereafter, the compensation unit outputs a compensation value based on the input compensation control signal to the actuation unit at step S116, and the actuation unit outputs a voltage reflecting the compensation value at step S118.

Figure 9:
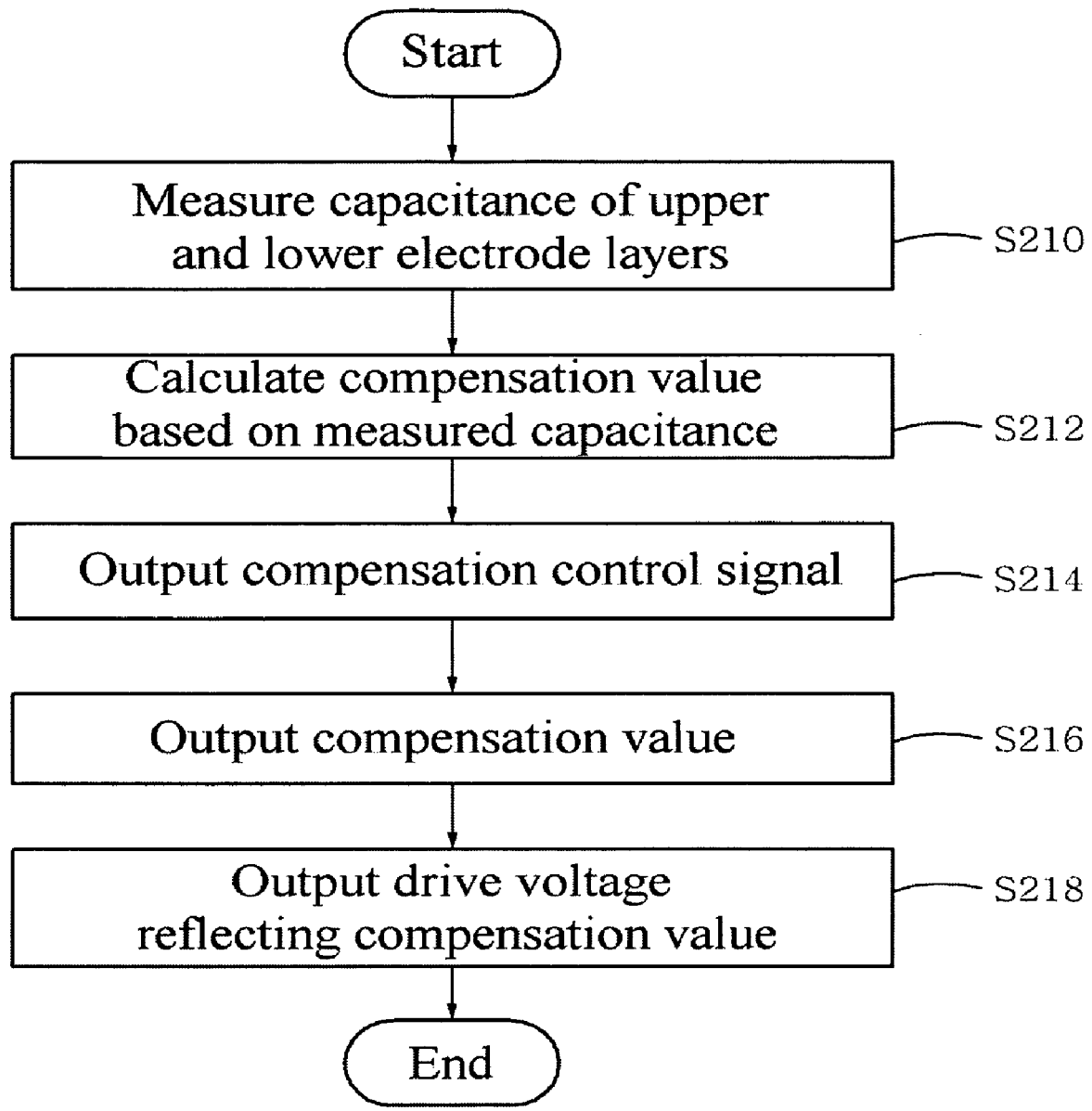
FIG. 9 is a flowchart illustrating a method of controlling the apparatus for measuring the position of the mirror of the diffractive light modulator and performing positional compensation according to FIG. 6.

FIG. 9 is a flowchart illustrating a method of controlling the apparatus for measuring the position of the mirror of the diffractive light modulator and performing positional compensation, according to another embodiment of the present disclosure.

Referring to the drawing, in the method of controlling the apparatus for measuring the position of the mirror of the diffractive light modulator and performing positional compensation, the capacitance measurement unit measures the capacitance of the upper electrode layer and lower electrode layer of the diffractive light modulator at step S210, and outputs the measured capacitance to the control unit.

The control unit has information about the intensity of diffracted light corresponding to the measured capacitance of the upper micromirror layer and the lower micromirror layer measured by the capacitance measurement unit, calculates a compensation value based on the information at step S212, and outputs a compensation control signal to the compensation unit at step S214.

Thereafter, the compensation unit outputs a compensation value based on the input compensation control signal to the actuation unit at step S216, and the actuation unit outputs a voltage reflecting the compensation value at step S218.

Figure 10:
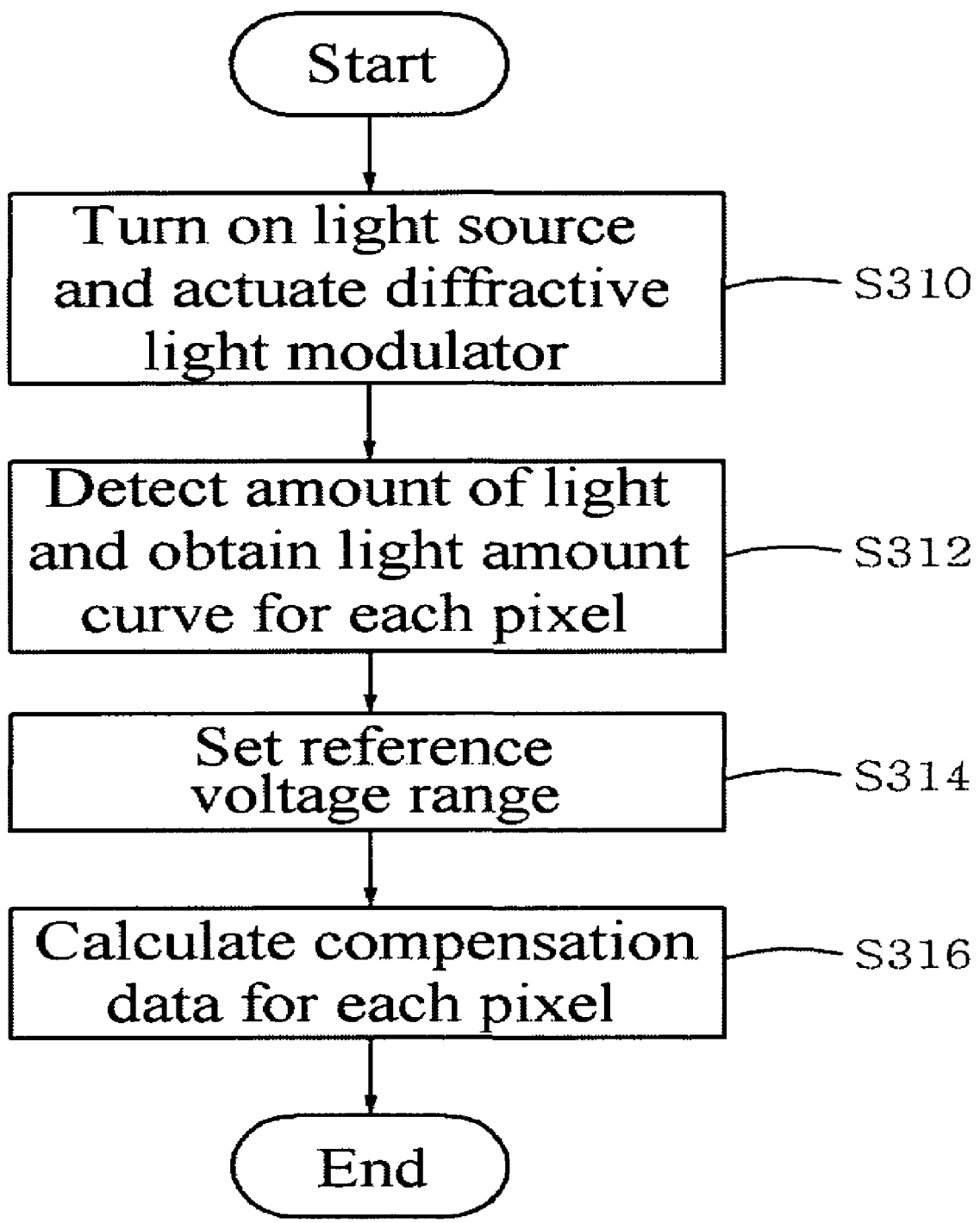
FIG. 10 is a flowchart illustrating a method of controlling the apparatus for measuring the position of the mirror of a diffractive light modulator and performing positional compensation, according to FIG. 7.
Figure 11:
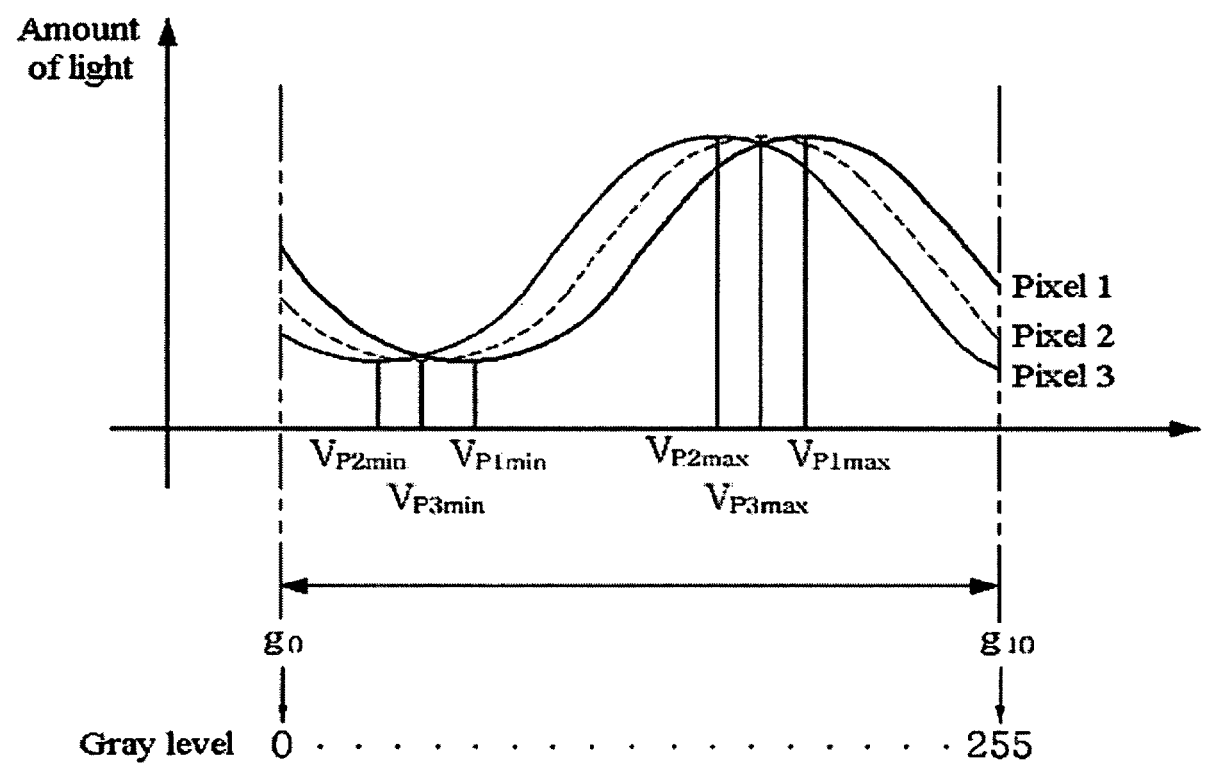
FIG. 11 is a graph illustrating light amount history curves that represent the amounts of output light with respect to applied voltages applied to the element of the diffractive light modulator.

FIG. 10 is a flowchart illustrating a method of controlling the apparatus for measuring the position of the mirror of a diffractive light modulator and performing positional compensation, according to another embodiment of the present disclosure.

Referring to the drawing, in the method of controlling the apparatus for measuring the position of the mirror of the diffractive light modulator and performing positional compensation, the control unit turns on a selected one of the light sources R, G, and B, and operates the diffractive light modulator by applying a drive control signal to the actuation unit at step S310.

Thereafter, the photosensor detects the amount of light and transmits the amount of light to the pixel-based detection unit, and the pixel-based light amount detection unit obtains a pixel-based light amount curve from the detected amount of light and displays the obtained pixel-based light amount curve on the display unit.

At this time, when the tester determines the reference voltage range so that it includes the lowest voltage capable of detecting the smallest amount of light for all of the pixels and the highest voltage capable of detecting the largest amount of light for all of the pixels, and inputs the reference voltage range through the input unit, the input reference voltage range is stored in the reference voltage storage unit at step S314.

Meanwhile, when the pixel-based light amount curve is input from the pixel-based light amount detection unit, the pixel-based correction data calculation unit calculates pixel-based correction data based on gray scale with reference to the reference voltage range stored in the reference voltage storage unit, arranges the pixel-based correction data in the table shown in FIG. 13, and stores it in the pixel-based correction data storage unit at step S316.

In this pixel-based detection and correction system, it could be assumed that any drift of the output from the diffractive light modulator from a reference level occurs simultaneously by all of the pixels. Moreover, the foregoing calibration/correction method can be applied to each pixel of the diffractive light modulator at each voltage level in the operational range of the modulator on a continuous basis. This enables constant drifting correction on a pixel-by-pixel basis.

The above-described present invention has the advantages of enabling the convenient measurement of the position of the upper micromirror and performing positional compensation.

Moreover, the present invention has the advantage of being capable of indirectly measuring the position of the upper micromirror using the capacitance of the upper micromirror layer and the lower micromirror layer or the capacitance of the upper electrode layer and the lower electrode layer and performing corresponding compensation, so that it is not necessary to be provided with an additional optical system.

Although the embodiments of the present invention have been disclosed for illustrative purposes, those skilled in the art will appreciate that various modifications, additions and substitutions are possible, without departing from the scope and spirit of the invention as disclosed in the accompanying claims.

In another embodiment, rather than diverting the output from the modulator 712 via mirror 713 to photosensor 714, a photosensor, now shown, may be positioned in the optical stream at a location between the modulator and the scanner 715. Alternatively, the photosensor, not shown, may be located in the optical stream between the scanner 715 and the display screen 719, in which case the scanner is rendered inoperational. In this situation, scanning noise of the scanner does not interfere with the operation of the photosensor. Placing the optical sensor in these alternative locations is feasible when calibrating the diffractive light modulator at the "factory-level" during manufacture or from time to time during the operation of the diffractive optical modulator. It will be appreciated that the embodiment shown in FIG. 7 has the advantage that it can be used for "real-time" calibration simultaneously when the diffractive light modulator is being used to generate a display on screen 19. As such, calibration of the diffractive light modulator does not require any down time of the system shown in FIG. 7.

Figure 3:
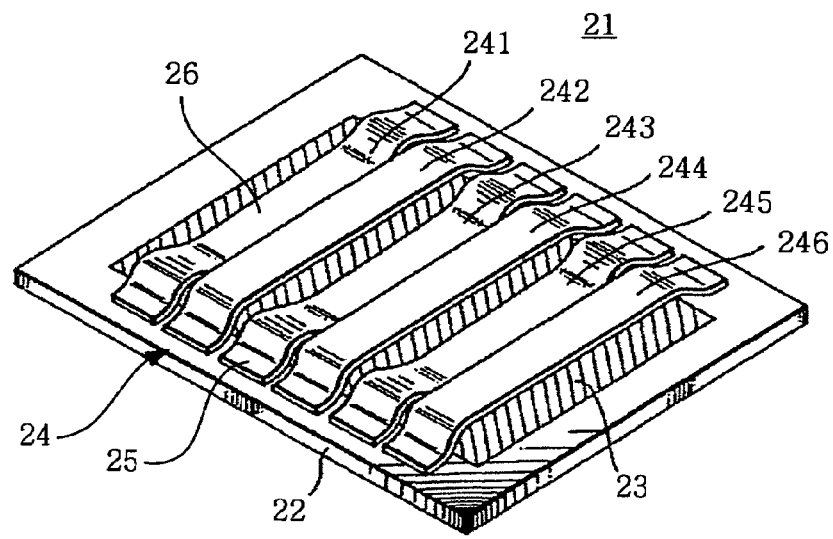
FIG. 3 is a diagram illustrating the construction of a Grating Light Valve (GLV) device used as a light intensity conversion device for a laser display, that is, a light modulator.

The present invention has been disclosed with respect to various types of diffractive light modulators, including those illustrated in FIGS. 4A, 4B, 5A, 6, and 7. The present invention may also be employed with respect to other types of diffractive light modulators, including the modulator disclosed in FIG. 3.

Figure 14:
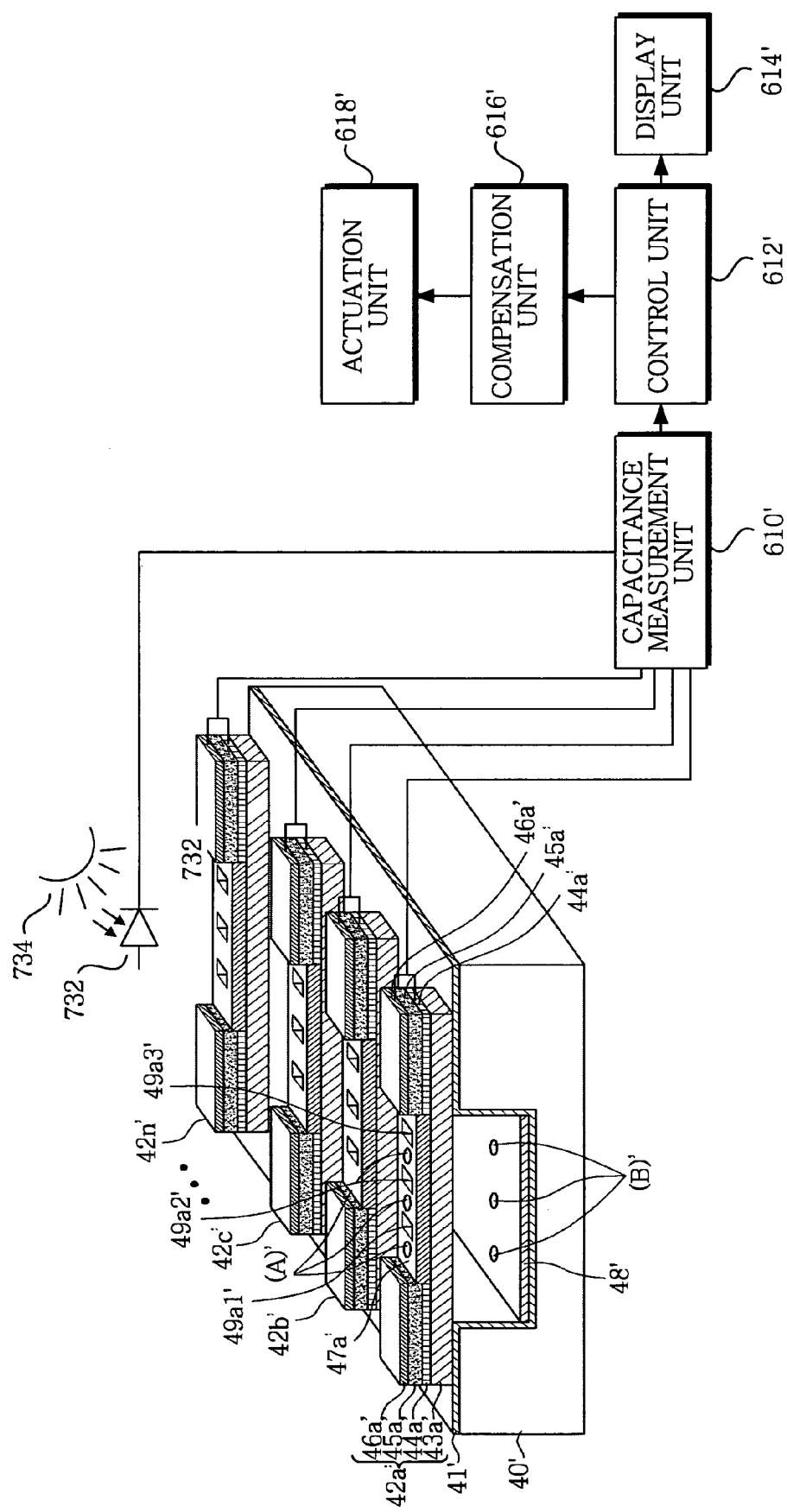
FIG. 14 is a diagram illustrating another apparatus for measuring the position of the mirror of a diffractive light modulator and performing positional compensation.

FIG. 14 is a diagram illustrating another construction of an apparatus for measuring the position of the mirror of a diffractive light modulator and performing positional compensation. The apparatus of FIG. 14 is similar to the apparatus of FIG. 6, but with the addition of a light intensity measuring device in the form of a photodiode 732. In FIG. 14, the components that are the same or that correspond to the components of FIG. 6 are given the same number but with a prime (') designation.

The photodiode 732 is capable of measuring the light from the light source that is also received by the diffractive light modulator and outputs this information to the capacitance measurement unit 610'. The photodiode 732 may be mounted on or adjacent to the diffractive light modulator. The photodiodes, such as photodiode 732, are articles of commerce.

The information from the photodiode can be used to correct the measurement of the capacitance of the upper and lower micromirror layers. The capacitance measurement unit 610 does not always result in an accurate capacitance measurement due to surface charges induced onto the micromirror layers by the lasers comprising the light source 734.

It will be appreciated that rather than using a singular photodiode 732, an array of photodiodes could be used in conjunction with the diffractive light modulator. Such array of photodiodes would have the advantage of reducing the noise generated if only a single photodiode were utilized.

Moreover, in addition to implementing the photodiode 732, or an array of photodiodes, in conjunction with the apparatus of FIG. 6, such photodiode or array of photodiodes also could be implemented with the apparatus of FIG. 5A. Other than the addition of photodiode 732, the apparatus shown in FIG. 14 functions in the same or similar manner as the apparatus shown in FIGS. 5A and 6.

What is claimed is:

1. An apparatus for measuring the position of a mirror of a diffractive light modulator used in a display system and performing compensation, the display system processing light diffracted from the diffractive light modulator for subsequent display, comprising:
   a position measurement unit for measuring the position of a mirror of the diffractive light modulator based on evaluating the light emitted from the diffractive light modulator at a location prior the display system;
   a control unit for calculating a value of displacement of the mirror from a reference position by evaluating a position value calculated by the position measurement unit, calculating a compensation value based on the displacement value and outputting a compensation control signal; and
   a compensation and actuation unit for performing compensation on a drive voltage in response to the compensation control signal input from the control unit, and actuating the mirror of the diffractive light modulator using the compensated drive voltage.

2. The apparatus as set forth in claim 1, wherein the position measurement unit measures the position of the mirror by measuring capacitance of the mirror relative to a reference electrode.

3. The apparatus according to claim 2, further comprising a light intensity measuring device to measure the light incident on the mirror, which light measurement is available for calibrating the position measurement unit.

4. The apparatus according to claim 3, wherein the light intensity measuring device comprises a photodiode.

5. The apparatus according to claim 4, wherein the photodiode is mounted on or adjacent the diffractive light modulator.

6. The apparatus as set forth in claim 1:
   wherein the diffractive light modulator comprises a piezoelectric actuator for actuating the diffractive light modulator, the piezoelectric actuator having at least one electrode;
   wherein the position measurement unit measures the position of the mirror by measuring capacitance of an electrode of the piezoelectric actuator relative a reference electrode.

7. An apparatus for calibrating a diffractive light modulator for a display system, comprising:
   a light source for generating light and emitting the light;
   a diffractive light modulator for generating diffracted light by modulating the light incident from the light source when a drive signal is input, the diffractive light for use in creating an optical output display;
   drive means for transmitting a drive signal to the diffractive light modulator;
   a light detector for measuring the amount of diffracted light emitted by the diffractive light modulator, the measurement occurring at a location prior to the optical output display; and
   calibration data calculation means for calculating pixel-based calibration data using the amount of diffracted light obtained by the light detector throughout a reference voltage range based on the amount of diffracted light measured by the light detector.

8. The apparatus as set forth in claim 7, further comprising a reflecting mirror for directing part of the diffracted light emitted from the diffractive light modulator to the light detector.

9. The apparatus as set forth in claim 8, wherein an amount of diffracted light that the reflecting mirror causes to be incident on the light detector is $1/2 \sim 1/100$ of the diffracted light emitted from the diffractive light modulator.

10. The apparatus as set forth in claim 7, wherein the light detector comprises:
    a photosensor for measuring the amount of diffracted light emitted to the diffractive light modulator; and
    a pixel-based light amount detection unit for calculating an amount of light for each pixel with reference to the amount of diffracted light measured by the photosensor.

11. The apparatus as set forth in claim 10, further comprising a display unit for displaying the amount of light calculated by the light detection unit.

12. The apparatus as set forth in claim 7, wherein the calibration data calculation means comprises:
a reference voltage data storage unit for storing the reference voltage range to be tested; and
a pixel-based calibration data calculation means for calculating pixel-based calibration data with reference to the reference voltage data range stored in the reference voltage storage unit and the amount of light received by the light detector.

13. The apparatus as set forth in claim 12, further comprising a pixel-based calibration data storage unit for storing the pixel-based calibration data calculated by the pixel-based calibration data calculation unit.

14. The apparatus as set forth in claim 7, wherein the light detector is disposed in the optical path between the diffractive light modulator and the optical output display.

15. The apparatus as set forth in claim 14:
(a) further comprising a scanner for generating a two-dimensional display based on the diffracted light emitted from the diffractive light modulator; and
(b) the light detector is positioned within the optical path between the diffractive light modulator and the scanner.

16. The apparatus as set forth in claim 7:
(a) further comprising a scanner for generating a two-dimensional display using the light diffracted from the diffractive light modulator; and
(b) the light detector located in the optical path downstream from the scanner.

17. A method for operating a diffractive light modulator having a micromirror for diffracting incident light, comprising:
(a) measuring the position of a micromirror of the diffractive light modulator at a specific drive voltage applied to the diffractive light modulator by measuring a value related to the position of the micromirror;
(b) calculating the displacement of the micromirror from a reference position by measuring the value related to the position of the micromirror;
(c) calculating a compensation value based on the measured value relating to the position of the micromirror relative to a reference position;
(d) generating the diffractive light modulator drive voltage in response to the calculated compensation value; and
(e) actuating the micromirror using the generated drive voltage.

18. The method as set forth in claim 17, wherein measuring the position of the micromirror is carried out by measuring the capacitance of the micromirror relative to a reference electrode.

19. The method as set forth in claim 18, further comprising:
measuring the light incident on the diffractive light modulator by an alternative method to measuring the position of the micromirror; and
using the measured light incident on the diffractive light modulator to monitor the accuracy of measuring the position of the micromirror by measuring of the capacitance of the micromirror relative to a reference electrode.

20. The method as set forth in claim 19, wherein the measuring of the light incident on the diffractive light modulator is carried out by one of a photodiode and a photodiode array.

21. The method as set forth in claim 20, wherein one of the photodiode and photodiode array is mounted on the diffractive light modulator.

22. The method according to claim 17:
wherein the diffractive light modulator comprising a piezoelectric actuator for actuating the diffractive light modulator, the piezoelectric actuator having at least one electrode; and
wherein measuring the position of the micromirror of the diffractive light modulator is carried out by measuring the capacitance of the piezoelectric electrode relative to a reference electrode.

23. The method as set forth in claim 17:
wherein the diffractive light modulator comprising a plurality of micromirrors for diffracting incident light; and
calculating a compensation value for each of the micromirrors based on the assumption that all of the micromirrors are displaced from a reference position.

24. The method as set forth in claim 17:
wherein the diffractive light modulator comprising a plurality of micromirrors; and
measuring the position of each of the micromirrors of the diffractive light modulator in a range of specific drive voltages applied to the diffractive light modulators on a continual basis during operation of the diffractive light modulator to correct micromirror by micromirror displacement from a reference position of the micromirrors.

25. A method of calibrating a diffractive light modulator composed of a plurality of diffractive micromirrors used to generate an optical display, comprising:
(a) actuating the diffractive light modulator via an actuating voltage;
(b) measuring the amount of light emitted by the diffractive light modulator on a pixel-by-pixel basis at a location prior to the generated display;
(c) determining the difference between the measured light level and a reference light level through the operational voltage range of the diffractive light modulator; and
(d) calculating a calibration factor related to the difference in the level of light emitted by the diffractive light modulator relative to the reference level of light at a specific actuating voltage.

26. The method according to claim 25, further comprising adjusting the actuating voltage for actuating the diffractive light modulator based on the calculated calibration factor.

27. The method according to claim 25, wherein the calibration factor is calculated on a pixel-by-pixel basis throughout the operational voltage range of the diffractive light modulator and the actuating voltage for actuating the diffractive light modulator being ratified on a pixel-by-pixel basis based on the calculated calibration factor for each pixel.

28. The method according to claim 25:
further comprising scanning the light emitted from the diffractive light modulator to generate a two-dimensional display; and
measuring the light emitted from the diffractive light modulator at a position between the diffractive light modulator and the scanner.

29. The method as set forth in claim 25:
further comprising scanning the light emitted from the diffractive light modulator to generate a two-dimensional output display; and
measuring the amount of light emitted by the diffractive light modulator at a location downstream from the location that the diffractive light is scanned, when the scanning mirror is not in operation.

30. The method according to claim 25, wherein the calibration factor is calculated based on the difference between the light from the diffractive light modulator generated when a test voltage is applied to the diffractive light modulator relative to the expected level of light to be emitted by the diffractive light modulator at the test voltage.

31. The method according to claim 30, wherein calculating the correction factor further comprises:
   matching an input reference voltage with the gray scale level;
   determining the actual gray scale level corresponding to the light emitted from the diffractive light modulator;
   preparing a correction data table using the gray scale levels obtained at each test voltage; and
   using the difference between the measured gray scale level and the reference gray scale level at a particular voltage to correct the gray scale level of the diffracted light from the diffractive light modulator.

* * * * *

UNITED STATES PATENT AND TRADEMARK OFFICE
CERTIFICATE OF CORRECTION

PATENT NO. : 7,569,805 B2
APPLICATION NO. : 11/449534
DATED : August 4, 2009
INVENTOR(S) : Yun et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 728 days.

Signed and Sealed this

Seventh Day of September, 2010

David J. Kappos
*Director of the United States Patent and Trademark Office*